June 24, 1952 E. K. HANSEN 2,601,608
GRAIN UNLOADER HAVING A FEED AUGER
WITH AN ADJUSTABLE COVER
Filed Nov. 3, 1947 2 SHEETS—SHEET 1
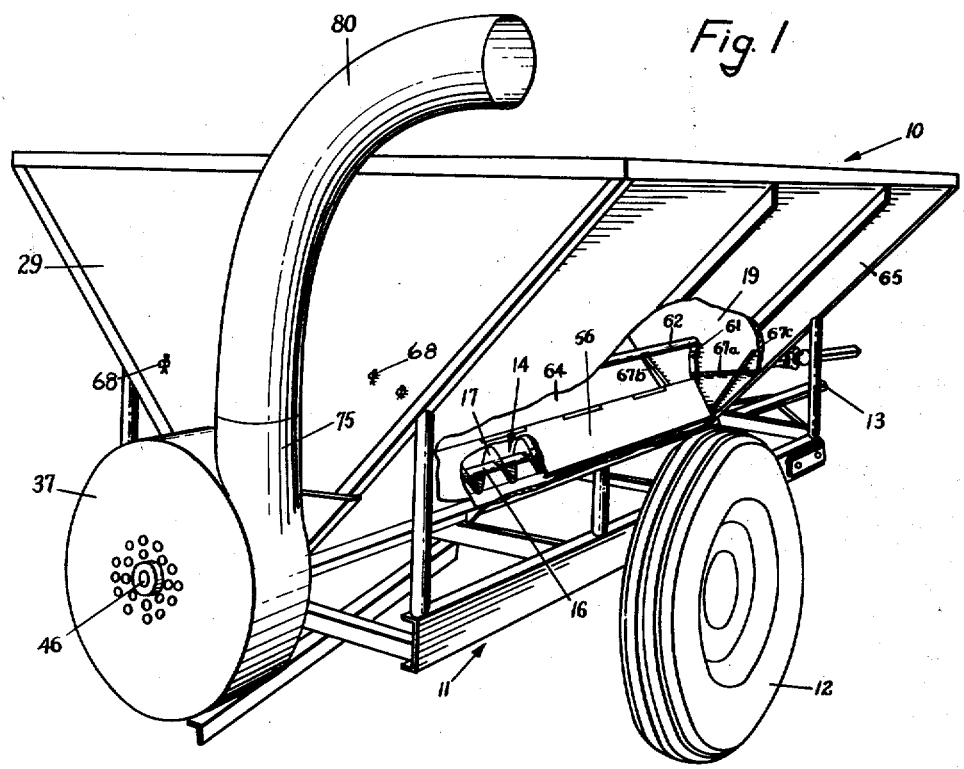
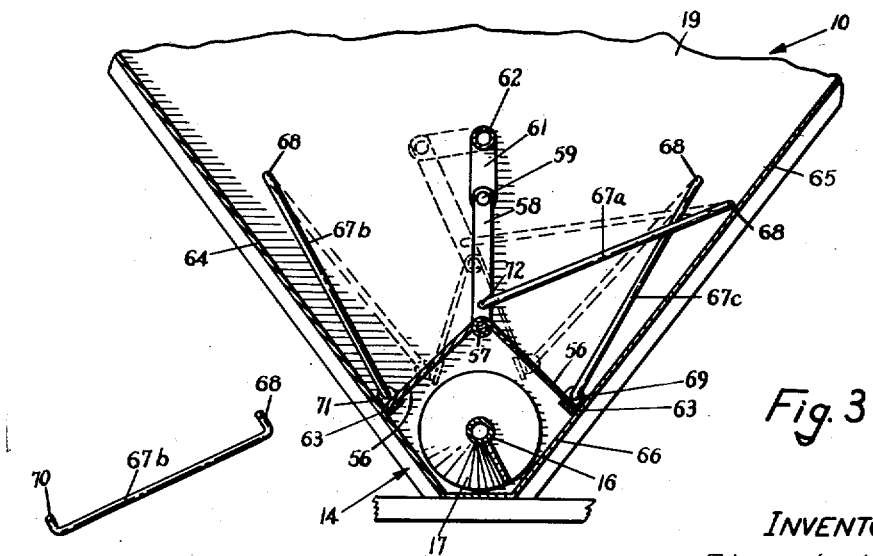
INVENTOR
Elmer K. Hansen
By Rudolph L. Lowell
Att'y.

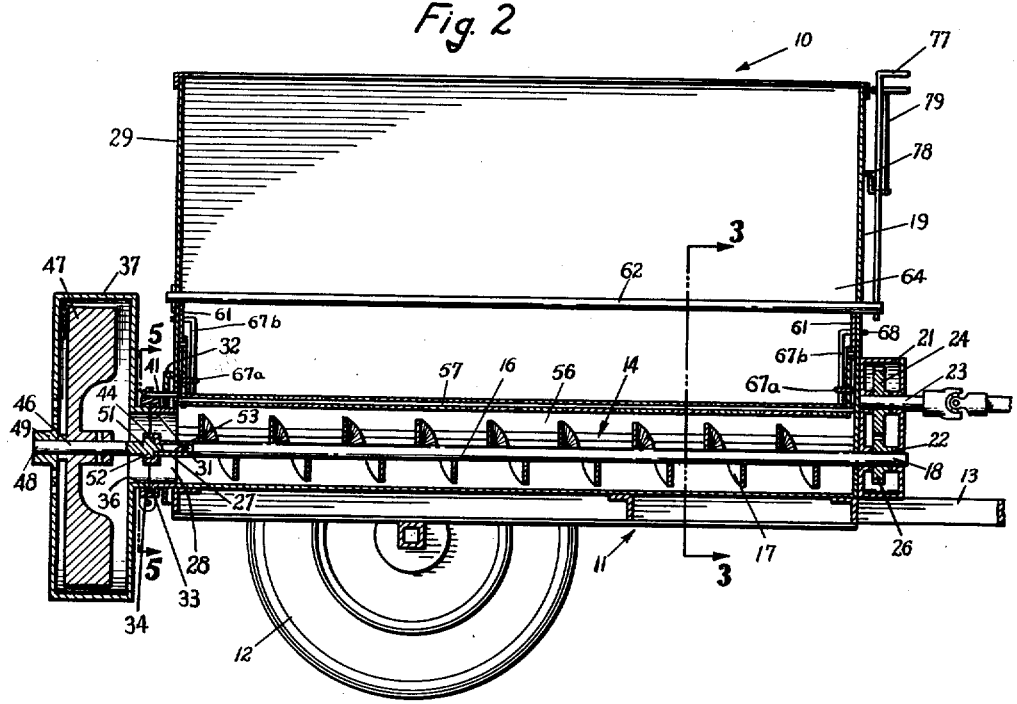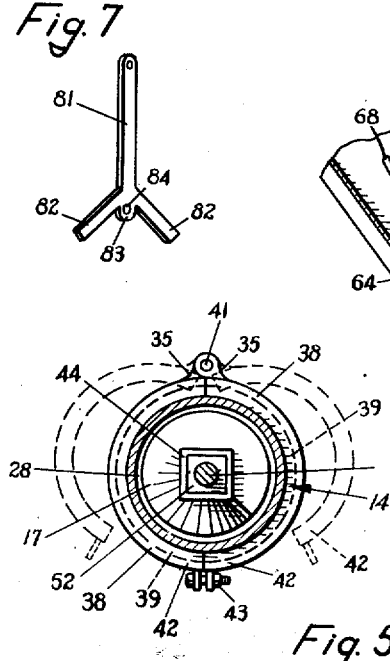
INVENTOR
Elmer K. Hansen

Patented June 24, 1952

2,601,608

UNITED STATES PATENT OFFICE 2,601,608

GRAIN UNLOADER HAVING A FEED AUGER WITH AN ADJUSTABLE COVER

Elmer K. Hansen, Sioux City, Iowa

Application November 3, 1947, Serial No. 783,802

3 Claims. (Cl. 222—413)

This invention relates generally to grain unloading devices and in particular to an unloading device for a portable grain box adapted to deliver grain from the box to a storage bin, a feed bin, a feed grinder and the like.

In harvesting grain with a combine or a thresher, the harvested grain is usually delivered into a wagon for transport to a storage bin. At the bin the grain is generally unloaded manually, or by an unloading device independent of the wagon, which operation is inconvenient and requires appreciable effort so that much time is lost in the unloading of the grain.

Also in the grain feeding of large herds, the grain is often times manually handled both in the filling of a wagon at the bin and the unloading of the wagon at the feed boxes. The feeding operation, as a result, utilizes much time and effort that could be more efficiently spent on other farm duties.

It is an object of this invention, therefore, to provide an improved unloading device for a portable grain box.

A further object of this invention is to provide a grain unloading device for a portable grain box adapted to be used in conjunction with threshers and combines to unload the grain in storage bins.

Another object of this invention is to provide a device for unloading grain from a wagon into a stock feed box of a construction such that feed supplements supplied to the grain in the wagon are mixed with the grain during the unloading operation.

Still a further object of this invention is to provide a grain unloading device for a wagon which is tractor operated and adapted to efficiently deliver the grain to positions above the level of the wagon.

Yet another object of this invention is to provide a tractor operated unloading device for a grain wagon in which the grain from the wagon is admitted to the loading device at a rate dependent upon the type of feed in the wagon and the available power supply on the tractor so as to eliminate any stalling of the device by overloading.

A feature of this invention is found in the provision of an unloading device for a portable grain box of a trough shape, in which a longitudinal feed auger at the bottom of the box is connected at one end with a source of power and has its opposite end extended through a grain discharge outlet in an end wall of the grain box. A hinged cover for the auger is adjustably supported for up and down movement on the box and wall, such that on a downward movement thereof the cover is opened and moved into contact with the box side walls so as to enclose the auger, and on an upward movement thereof the cover is moved away from the box side walls to permit a gravity feed of grain from the box into the auger.

A further feature of this invention is found in the provision of an unloading device for a grain box in which a tractor operated feed auger at the bottom of the box is connected in a driven relation with a grain delivery unit carried at one end of the box and arranged to receive the grain fed by the auger. A cover for the auger is adjustably supported within the box for up and down movement between a lower auger-closing position and an upper position at which the auger is substantially uncovered. The box is filled, when the auger is covered, so that in unloading the box, the auger and grain delivery means can be brought up to speed prior to the moving of the cover toward its upper position to permit a gravity feed of the grain to the auger. A stalling of the tractor engine by an overloading of the auger and the delivery means is thus substantially eliminated.

Further objects, features and advantages of this invention will become apparent from the following description when taken in connection with the accompanying drawings, in which:

Fig. 1 is a perspective view of a portable grain box shown in assembly relation with the unloading device of this invention, with certain parts being broken away to more clearly show such assembly;

Fig. 2 is a vertical longitudinal sectional view of the assembly shown in Fig. 1;

Fig. 3 is a fragmentary transverse sectional view taken on the line 3—3 in Fig. 2;

Fig. 4 is a perspective detail view of a link member forming part of the unloading device;

Fig. 5 is an enlarged transverse sectional detail view taken along the line 5—5 in Fig. 2;

Fig. 6 is a sectional view illustrated similarly to Fig. 3 showing a modified form of the invention; and Fig. 7 is a detail perspective view of a connecting member forming part of the modified form shown in Fig. 6.

With reference to the drawings, the grain unloading device of this invention is illustrated in Fig. 1 in assembly relation with a two wheel wagon having a trough or V-shaped grain box 10 mounted on a horizontal frame 11 provided with ground wheels 12. A forward extension 13 on the frame 11 is adapted to be hitch connected with a usual farm tractor (not shown) for towing purposes.

Arranged within the box 10, and adjacent the bottom thereof, is a longitudinally extended auger or feed screw 14 (Figs. 1 and 2) including a hollow tubular shaft 16 and a spiral flight 17. The forward end 18 of the shaft 16 projects through the box front wall 19 and into a gear housing 21, where it is rotatably supported in bearings 22.

The housing 21 is mounted on the outside of the front wall 19 and includes a drive shaft 23, adapted for connection with a rear power take-off of a tractor. The drive shaft 23, within the housing 21, carries a gear 24 which is in continuous meshing engagement with a driven gear 26 mounted on the auger shaft 16. The rear power take-off of a tractor generally operates at a speed of about 530 R. P. M., and it is contemplated that the gears 24 and 26 be of a construction to provide for a 2 to 1 increase in the speed of the auger shaft, namely, 1060 R. P. M.

The rear end 27, of the auger shaft 16, projects within a discharge outlet 28 formed in the box back wall 29. The outlet 28 includes a collar or tubular extension 31 positioned within aligned openings formed in the back wall 29 and a brace plate 32 secured to the outside of the back wall 29 in a spaced relation therewith. The rear or outer end of the extension 31 terminates in a radial flange 33.

Adapted to fit in a back to back relation with the flange 33 is a mating flange 34 (Fig. 2) provided on the front end of an inlet 36 for a blower casing 37. The casing 37 is held in a supported position on the extension 31 by a split ring structure (Figs. 2 and 5) comprised of a pair of cooperating semi-circular sections 38 formed in their inner peripheral surfaces with open grooves 39 capable of receiving the flanges 33 and 34 therein. The upper ends 35 of the sections 38 are pivoted on a pin 41, projected rearwardly from the back wall 29, to provide for the swinging movement of their lower ends 42 away from each other to positions illustrated in dotted lines in Fig. 5.

To assemble the blower casing 37 with the box 10, the sections 38 are moved to their dotted line positions shown in Fig. 5, and the flange 34 is positioned concentric with and against the flange 33. The sections 38 are then moved to their full line positions shown in Fig. 5, whereby the flanges 33 and 34 are held against separation and rotatably supported within the grooves 39. This assembly relation of the blower inlet 36 and the auger outlet 28 is maintained by connecting together the lower ends 42 of the sections 38 by a bolt or like means, as indicated at 43.

As illustrated in Figs. 2 and 5, the rear end 27 of the auger shaft 16 terminates in a socket member 44 of a square shape in transverse cross section. A shaft 46 for carrying a blower or fan 47 has its rear end 48 rotatably supported in a bearing 49 provided in the blower housing 37 and its front end 51 projected through the blower inlet 36. The front end 51 of the blower shaft 46 is integrally formed with a square shaped member 52, adapted to be received within the socket 44, and a forward extension 53 on the square member 52 which is receivable within the rear end 27 of the auger shaft 16.

In the assembly of the blower casing 37 with the auger discharged outlet 28, in the manner above described, the extension 53 and square member 52 are positioned within the auger shaft 16 and the socket 44, respectively, concurrently with the arrangement of the flanges 33 and 34 in their concentric back to back position. It is thus seen that the blower shaft 46 constitutes a continuation of the auger shaft 16 so that the bearing 49 functions as a support for the auger shaft.

The auger 14 (Figs. 1 and 3) is provided with a cover unit comprised of a pair of like cover members 56 of substantially flat rectangular shapes, arranged in an inverted V relation and hingedly connected at their upper adjacent ends by a pivot or tie rod 57. As best appears in Fig. 2, the cover members 56 extend the full length of the box 10, between its end walls 19 and 29.

Pivotally connected at opposite ends of the tie rod 57, and within the box 10 (Figs. 2 and 3), are a pair of upright levers the upper ends of which are pivoted at 59 to the free ends of rock arms 61 mounted at opposite ends of a rock shaft 62 which is rotatably supported in the box end walls 19 and 29. The cover members 56, pivoted levers 58 and rock arms 61 are relatively constructed and arranged such that when the rock arms 61 and levers 58 are in vertical alignment in a plane common to the longitudinal axis of the auger shaft 16, the outer or lower sides 63 of the cover members 56 are in contact engagement with the box side walls 64 and 65 at positions such that the cover members 56 are in a covering relation relative to the auger 14, as shown in full lines in Fig. 3. In this full line position the auger 14 is completely enclosed by the cover members 56 and those portions 66 of the side walls 64 and 65 located below the lower or free sides 63 of the cover members 56.

A movement of the cover members 56 to their auger covering positions, in response to a movement of the rock arms 61 and pivoted links 58 to their vertically aligned positions, also shown in full lines in Fig. 3, is accomplished by the provision of means including like pivoted links 67a, 67b and 67c. Since links 67a, 67b and 67c are similarly assembled with the covers 56 and levers 58, at opposite ends of the box 10, only the assembly at the front end of the box will be referred to in detail in the following description.

Each of the rods 67a, 67b and 67c, as illustrated by the rod 67b in Fig. 4, have their opposite ends 68 and 70 laterally bent at right angles in the same direction. The rods 67b and 67c are arranged at opposite sides of the grain box 10 in reversely inclined positions, with their upper ends 68 (Figs. 2 and 3) extended through openings (not shown) formed in the front wall 19 and their lower ends 70 pivotally connected at 69 with upright ears or lugs 71 carried at opposite ends of the lower sides 63 of the cover members 56. The link 67a is pivotally connected at 72 with the pivoted lever 58 at a position spaced upwardly from the pivotal connection of the lever 58 with the tie rod 57. The link 67a, from its pivotal connection 72, extends upwardly and outwardly toward the side wall 65 of the grain box 10 and has its opposite or upper end 68 extended through an opening formed in the front wall 19.

On rotation of the rock shaft 62, the cover members 56 are concurrently moved upwardly and toward each other to raised positions, indicated in dotted lines in Fig. 3, to uncover the auger 14. Rotation of the rock shaft 62 is manually accomplished by means including a control lever 77 (Fig. 2) mounted on the rock shaft 62 to the outside of the front wall 19. A usual quadrant 78 and latch 79 are associated with the lever 77 to hold the lever in an adjusted position.

In the operation of the grain unloading device of this invention, let it be assumed that the covers 56 are in their auger covering positions shown in full lines in Fig. 3, and that the grain box 10 is filled with grain so that the auger 14 is completely enclosed by the covers 56 and those portions 66 of the side walls 64 and 65 located below the cover sides 63. A contact engagement of the box side walls 64 and 65 with the cover members is assured by the provision of flexible contact members along the cover member lower sides 63. Power from the tractor is then applied to the auger 14 and to the blower 47. Since no grain is admitted to the auger 14, the blower 47 and auger are readily brought up to their full rotational speed.

The lever 77 is then manipulated to move the cover members 56 toward their raised positions illustrated in dotted lines in Fig. 3 to admit grain from the grain box to the auger 14, by the action of gravity, at a rate commensurate with the type of grain being handled and the ability of the auger 14 and blower 47 to efficiently handle the grain for unloading purposes. Grain from the auger 14 is moved through the outlet 28 and into the casing inlet 36 where it is picked up by the blower 47 for discharge through the casing outlet 75 (Fig. 1).

The casing outlet 75 is provided with a discharge conduit 80 for directing the grain into a storage bin, feed box or the like. By virtue of the support of the casing inlet 36 within the split ring sections 38, the blower casing 37 is rotatably movable to in turn provide for a movement of the discharge conduit 80 to either side of the grain box 10 through an arc of substantially one hundred eighty degrees. Further, it is apparent that the grain can be emptied into storage bins at a position above the level of the grain box 10.

When grain is admitted from the box 10 to the auger 14, prior to a bringing of the auger 14 to its full rotational speed, it has been found that the load on the auger and blower usually results in a stalling of the tractor engine. This is generally the result of the grain being fed into the blower 47 before the blower is capable of discharging the grain supplied thereto. In other words, the grain merely collects in the blower housing 37 without being moved outwardly therefrom by the blower. The auger cover structure thus eliminates any engine stalling condition and further provides for a controlled feed of the grain from the box to the auger at a rate corresponding to the delivery or discharge capacity of the auger 14 and blower 47.

A modified form of the invention, shown in Figs. 6 and 7, is similar in all respects to the invention described in connection with Figs. 1 and 2 except for the substitution of pivoted levers 81 for the pivoted levers 58 and the elimination of the link 67a. Similar numerals of reference will be used, therefore, to designate like parts.

The lever 81 is of a substantially inverted Y-shape and is integrally formed at the junction of its legs 82 with a depending lug 83 formed with an opening 84 for pivotal connection with the tie rod 57, it being understood that a member 81 is provided at each end of the tie rod. The upper end of the lever 81 is pivotally connected at 86 with the free end of the rock arm 61. The links 67b and 67c are connected with the cover members 56 and the end walls 19 and 29 in all respects similar to the links 67b and 67c described in connection with Fig. 3.

When the cover members 56 are in their auger closing position, shown in full lines in Fig. 6, the legs 82 are in mating or contact engagement therewith. Stated otherwise, the apex of the cover structure, in a closed position of the cover members 56, corresponds to the angle of divergence of the legs 82 so as to be received between the legs 82. On rotation of the rock shaft 62, the links 67b and 67c are pivotally moved inwardly toward each other to provide for an inward movement of the cover members by the tie rod 57 to their dotted line positions shown in Fig. 6. On a rotation of the rock shaft 62 to move the rock arm 61 from its dotted line position toward its full line position, also shown in Fig. 6, only one of the legs 82 may initially engage a corresponding cover member 56. However, when the rock arm 61 and lever 81 are in their vertically aligned positions, shown in full lines in Fig. 6, both legs 82 will be engaged with their corresponding cover members 56, to provide for a flush engagement of the lower sides 63 of the cover members with the box side walls 64 and 65 so as to completely enclose the auger 14.

It is seen, therefore, that the invention provides an unloading device for a portable grain box which is of a simple and compact construction and capable of being efficiently operated from the rear power take-off of a usual farm tractor. The auger 14 is completely enclosed or separated from the grain in the grain box, at the beginning of an unloading operation, and the cover members 56 are manually movable to supply grain to the auger at a desired rate dependent upon the power supply to the auger and blower 47, and the type of grain being handled. The blower 47 is readily removable from the auger outlet 28 by merely removing the bolt 43 and swinging the split ring sections 38 apart from each other. Where a chain and bucket conveyor is desired in place of the blower 47, the open frame or chute for such conveyor (not shown) may be constructed similarly to the fan inlet 36 for connection with the auger outlet 28. A socket connection similar to the connection 44—52 may be provided on the drive shaft for the conveyor.

Although the invention has been described with respect to several embodiments thereof, it is to be understood that it is not to be so limited since changes can be made therein which are within the full intended scope of this invention as defined by the appended claims.

I claim:

1. A grain unloading device for a trough shaped grain box having end walls, side walls and a grain outlet in one of said end walls, a longitudinally extended auger at the bottom of said box for delivering grain to said outlet, a pair of hinged cover members arranged in an inverted V-relation and extended between said end walls, a hinge connection between the adjacent sides of said cover members, means for moving said cover members into and out of a covering relation with said auger including pairs of upright link members arranged at opposite sides of said auger, with the lower ends of said link members being pivotally connected to the outer sides of said cover members and the upper ends of said link members being pivotally supported on said end walls, a longitudinal rock shaft spaced above said auger and supported on said end walls, rock arms adjacent the opposite ends of said rock shaft, a pair of upright levers pivotally connected at their lower ends to the opposite ends of said hinge connection and at their upper ends to the free ends of said rock arms, with said rock arms being in generally horizontal positions when said cover members are out of said covering relation, and in generally vertical positions when said cover members are in said auger covering relation, means for rocking said rock shaft, and means for guiding the movement of said upright levers to a position in substantial longitudinal alignment with said rock arms, when said cover members are in said auger covering relation.

2. A grain unloading device for a trough shaped grain box having end walls, side walls and a grain outlet in one of said end walls comprising, a longitudinally extended auger at the bottom of said box for delivering grain to said outlet, a pair of hinged cover members arranged in an inverted V-relation extended between said end walls at a position above said auger, a hinge connection between the inner adjacent sides of said cover members, lever means supporting said cover members for up and down movement carried on said end walls and pivotally connected to opposite ends of said hinge connection, link means pivotally connected to the outer sides of said cover members and to the end walls of said box for moving said cover members in a first open position in contact engagement with said side walls, to enclose said auger, and in a second folded position away from said side walls, in response to the up and down movement of said lever means, and means for guiding said lever means to substantially upright positions when the cover members are in said first position.

3. In a material unloading device for a container having an auger mounted for rotation on the bottom thereof for discharging material therefrom, a pair of hingedly connected cover members arranged in an inverted V-shape relation and extended longitudinally of said container above said auger, a linkage system pivotally supported on each end of said container for movably and independently supporting said cover members including first members connected to the hinged connection between said cover members, and second members connected to the outer sides of said cover members, means connected with said first members for raising and lowering said cover members, with said second members acting to move said cover members toward each other on upward movement thereof, and away from each other and in a covering relation with said auger on downward movement thereof, and means for guiding said first members into generally upright positions when said cover members are in a covering relation with said auger.

ELMER K. HANSEN.

REFERENCES CITED

The following references are of record in the file of this patent:

UNITED STATES PATENTS

| Number | Name | Date |
|---|---|---|
| 2,412,121 | Bradshaw | Dec. 3, 1946 |
| 2,421,418 | Grossman | June 3, 1947 |